United States Patent
Noca et al.

(10) Patent No.: US 7,491,628 B2
(45) Date of Patent: Feb. 17, 2009

(54) METHOD FOR PATTERNING LARGE SCALE NANO-FIBROUS SURFACES USING CAPILLOGRAPHY

(75) Inventors: Flavio Noca, Altadena, CA (US); Elijah B. Sansom, Pasadena, CA (US); Jijie Zhou, Singapore (SG); Morteza Gharib, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/124,523

(22) Filed: May 5, 2005

(65) Prior Publication Data

US 2006/0088848 A1 Apr. 27, 2006

Related U.S. Application Data

(60) Provisional application No. 60/568,563, filed on May 5, 2004.

(51) Int. Cl.
*H01L 21/20* (2006.01)
*H01L 21/36* (2006.01)

(52) U.S. Cl. .................. 438/493; 438/500; 438/507; 438/758; 438/800; 257/E51.04; 257/E21.09; 977/742

(58) Field of Classification Search ............ 977/743, 977/846, 753, 734, 745, 754, 763, 773, 842, 977/847, 890, 738, 742; 438/1, 5, 584, 492, 438/493, 500, 502, 507, 758, 800, 962; 257/E23.074, 257/E23.165, E51.038, E51.04, E21.09
See application file for complete search history.

(56) References Cited

U.S. PATENT DOCUMENTS 3,955,015 A 5/1976 Ohtsuka et al.
4,104,204 A 8/1978 Williams
4,173,474 A 11/1979 Tanaka et al.
4,173,475 A 11/1979 Chandross et al.
4,260,725 A 4/1981 Keogh et al.

(Continued)

FOREIGN PATENT DOCUMENTS

DE 3605512 A1 8/1986

(Continued)

OTHER PUBLICATIONS

U. Kim et al, "Synthesis of High-Density Carbon Nanotube Films by Microwave Plasma Chemical Vapor Deposition", Diamond and Related Material.vol. 10, issue 11, Nov. 2001. pp. 1947-1951.*

(Continued)

*Primary Examiner*—Michelle Estrada
*Assistant Examiner*—Quovaunda Jefferson
(74) *Attorney, Agent, or Firm*—Christie, Parker & Hale, LLP.

(57) ABSTRACT

A method of assembling large numbers of nanoscale structures in pre-determined ways using fluids or capillary lithography to control the patterning and arrangement of the individual nanoscale objects and nanostructures formed in accordance with the inventive method are provided. In summary, the current method uses the controlled dispersion and evaporation of fluids to form controlled patterns of nanoscale objects or features anchored on a substrate, such as nanoscale fibers like carbon nanotubes.

32 Claims, 16 Drawing Sheets

U.S. PATENT DOCUMENTS

| | | | |
|---|---|---|---|
| 4,330,383 A | 5/1982 | Ellis et al. | |
| 4,575,373 A | 3/1986 | Johnson | |
| 4,617,350 A | 10/1986 | Maeda et al. | |
| 4,685,921 A | 8/1987 | Peyman | |
| 4,787,903 A | 11/1988 | Grendahl | |
| 4,790,847 A | 12/1988 | Woods | |
| 4,816,031 A | 3/1989 | Pfoff | |
| 4,846,172 A | 7/1989 | Berlin | |
| 4,921,589 A | 5/1990 | Yates et al. | |
| 4,942,112 A | 7/1990 | Monroe et al. | |
| 5,066,301 A | 11/1991 | Wiley | |
| 5,110,339 A | 5/1992 | Ciriello et al. | |
| 5,141,678 A | 8/1992 | Blum | |
| 5,171,266 A | 12/1992 | Wiley et al. | |
| 5,173,381 A | 12/1992 | Natansohn et al. | |
| 5,213,825 A | 5/1993 | Shimizu et al. | |
| 5,258,024 A | 11/1993 | Chavel et al. | |
| 5,288,293 A | 2/1994 | O'Donnell, Jr. | |
| 5,296,305 A | 3/1994 | Baude et al. | |
| 5,443,506 A | 8/1995 | Garabet | |
| 5,443,955 A | 8/1995 | Cornell et al. | |
| 5,470,662 A | 11/1995 | Weber et al. | |
| 5,480,428 A | 1/1996 | Fedorov et al. | |
| 5,529,861 A | 6/1996 | Redfield | |
| 5,623,002 A | 4/1997 | Nomura et al. | |
| 5,684,636 A | 11/1997 | Chow et al. | |
| 5,702,846 A | 12/1997 | Sato et al. | |
| 5,725,575 A | 3/1998 | O'Donnell, Jr. | |
| 5,728,155 A | 3/1998 | Anello et al. | |
| 5,728,156 A | 3/1998 | Gupta et al. | |
| 5,744,267 A | 4/1998 | Meerholz et al. | |
| 5,762,836 A | 6/1998 | Bos et al. | |
| 5,807,906 A | 9/1998 | Bonvallot et al. | |
| 5,837,115 A | 11/1998 | Austin et al. | |
| 5,858,585 A | 1/1999 | Haarer et al. | |
| 5,892,601 A | 4/1999 | Curtis et al. | |
| 5,920,536 A | 7/1999 | Campbell et al. | |
| 5,943,145 A | 8/1999 | Curtis et al. | |
| 5,948,470 A | 9/1999 | Harrison et al. | |
| 5,964,802 A | 10/1999 | Anello et al. | |
| 5,984,962 A | 11/1999 | Anello et al. | |
| 5,995,251 A | 11/1999 | Hesselink et al. | |
| 5,998,096 A | 12/1999 | Umemoto et al. | |
| 6,027,623 A | 2/2000 | Ohkawa | |
| 6,046,290 A | 4/2000 | Berneth et al. | |
| 6,146,227 A | 11/2000 | Mancevski | |
| 6,154,432 A | 11/2000 | Faruqi et al. | |
| 6,232,706 B1 | 5/2001 | Dai et al. | |
| 6,235,675 B1* | 5/2001 | McIlroy | 502/177 |
| 6,271,281 B1 | 8/2001 | Liao et al. | |
| 6,278,231 B1 | 8/2001 | Iwasaki et al. | |
| 6,346,189 B1 | 2/2002 | Dai et al. | |
| 6,361,861 B2 | 3/2002 | Gao et al. | |
| 6,383,923 B1* | 5/2002 | Brown et al. | 438/666 |
| 6,399,406 B2 | 6/2002 | Chan et al. | |
| 6,401,526 B1 | 6/2002 | Dai et al. | |
| 6,440,761 B1 | 8/2002 | Choi | |
| 6,517,995 B1* | 2/2003 | Jacobson et al. | 430/320 |
| 6,685,810 B2 | 2/2004 | Noca et al. | |
| 6,766,817 B2 | 7/2004 | da Silva | |
| 2001/0021534 A1* | 9/2001 | Wohlstadter et al. | 436/518 |
| 2001/0051367 A1* | 12/2001 | Kiang | 435/182 |
| 2003/0052006 A1 | 3/2003 | Noca et al. | |
| 2004/0166235 A1* | 8/2004 | Fujii et al. | 427/77 |
| 2006/0073089 A1* | 4/2006 | Ajayan et al. | 423/447.2 |

FOREIGN PATENT DOCUMENTS

| | | |
|---|---|---|
| EP | 0472384 A2 | 2/1992 |
| EP | 0689067 A2 | 12/1995 |
| JP | 60175009 | 9/1985 |
| JP | 01120740 | 5/1989 |
| JP | 05-096553 | 4/1993 |
| JP | 07281426 | 10/1995 |
| JP | 08101499 | 4/1996 |
| JP | 08101502 | 4/1996 |
| JP | 08101503 | 4/1996 |
| WO | WO 93/21245 A1 | 10/1993 |
| WO | WO 95/17460 A1 | 6/1995 |
| WO | WO 98/05272 A1 | 2/1998 |
| WO | WO 98/27863 A1 | 7/1998 |
| WO | WO 99/26112 A1 | 5/1999 |
| WO | WO 00/41650 A1 | 7/2000 |
| WO | WO 01/21061 A1 | 3/2001 |
| WO | WO 01/71411 A2 | 9/2001 |
| WO | WO 01/86647 A2 | 11/2001 |
| WO | WO 02/093738 A2 | 11/2002 |

OTHER PUBLICATIONS

Chakrapani et al. "Cappillarity-Driven Assembly of Two-Dimensional Cellular Carbon Nanotube Foams". Mar. 3, 2004, PNAS vol. 101, No. 12, pp. 4009-4012.*

Bower, Chris. "Plasma Induced Alignment of Carbon Nanotubes". 2000 Applied Physics Letters. vol. 77, No. 6. Aug. 7, 2000.*

Dujardin et al, "Capillarity and Wetting of Carbon Nanotubes", Sep. 23, 1994, Science vol. 265, pp. 1850-1851.*

Avrutsky et al., "Multiwavelength Diffraction and Apodization Using Binary Superimposed Gratings", IEEE Photonics Technology Letters, Jun. 1998, vol. 10, No. 6, pp. 839-841.

Baughman et al., "Carbon Nanotube Actuators", Science, May 21, 1999, vol 284, pp. 1340-1344.

Boul et al., "Reversible Sidewall Functionalization of Buckytubes", Chemical Physics Letters, Sep. 3, 1999, vol. 310, pp. 367-372.

Chen et al., "Plasma-Induced Low-Temperature Growth of Graphic Nanofibers on Nickel Susbstrates", Journal of Crystal Growth, 1998, vol. 193, pp. 342-346.

Choi et al., "Growth of Carbon Nanotubes by Microwave Plasma-Enhanced Chemical Vapor Deposition at Low Temperature", J. Vac. Sci. Technol., Jul./Aug. 2000, vol. 18, No. 4, pp. 1864-1868.

Chou et al., "A Microfabricated Device for Sizing and Sorting DNA Molecules", Proc. Natl. Acad. Sci. USA, Jan. 1999, vol. 96, pp. 11-13.

Dial et al., "Fabrication of High-Density Nanostructures by Electron Beam Lithography", J. Vac. Sci. Technol. B, Nov./Dec. 1998, vol. 16, No. 6, pp. 3887-3890.

Drmanac et al., "Sequencing by Hybridization", Chapter 4 from Automated DNA Sequencing and Analysis, Academic Press,1994, pp. 29-36, title page, copyright page.

Duke et al., "Pulsed-Field Electrophoresis in Microlithographic Arrays", Electrophoresis, 1996, vol. 17, pp. 1075-1079.

Duke et al., "Sequencing in Nanofabricated Arrays: A Feasibility Study", Electrophoresis, 1997, vol. 18, pp. 17-22.

Fan et al., "Self-Oriented Regular Arrays of Carbon Nanotubes and Their Field Emission Properties", Science, Jan. 22, 1999, vol. 283, pp. 512-514.

Hadd et al., "Sub-Microliter DNA Sequencing for Capillary Array Electrophoresis", Journal of Chromatography A, 2000, vol. 894, pp. 191-201.

Hafner et al., "Direct Growth of Single-Walled Carbon Nanotube Scanning Probe Microscopy Tips", J. Am. Chem. Soc., 1999, vol. 121, pp. 9750-9751.

Hafner et al., "Catalytic Growth of Single-Wall Carbon Nanotubes From Metal Particles", Chemical Physics Letters, Oct. 30, 1998, vol. 296, pp. 195-202.

Han et al., "Entropic Trapping and Escape of Long DNA Molecules at Submicron Size Constriction", Physical Review Letters, Aug. 23, 1999, vol. 83, No. 8, pp. 1688-1691.

Han et al, "Observation and Modeling of Single-Wall Carbon Nanotube Bend Junctions", Physical Review B, Jun. 15, 1998, vol. 57, No. 23, pp. 983-989.

Han et al., "Synthesis of Carbon Nanotube Bridges on Patterned Silicon Wafers by Selective Lateral Growth", Journal of Applied Physics, Dec. 1, 2001, vol. 90, No. 11, pp. 5731-5734.

Harrison et al., "Lithography With a Mask of Block Copolymer Microstructures," J. Vac. Sci. Technol. B, Mar./Apr. 1998, vol. 16, No. 2, pp. 544-552.

Hoppe et al., "Arrays of Carbon Nanotubes as RF Filters in Waveguides," May 9, 2003, website http://www.nasatech.com/Briefs/Apr03/NPO30207.html, 2 pgs.

Li et al., "Highly-Ordered Carbon Nanotube Arrays for Electronics Applications," Applied Physics Letters, Jul. 19, 1999, vol. 75, No. 3, pp. 367-369.

Huang, et al., "Growth of Highly Oriented Carbon Nanotubes by Plasma-Enhanced Hot Filament Chemical Vapor Deposition", Applied Physics Letters, Dec. 28, 1998, vol. 73, No. 26, pp. 3845-3847.

Hutt et al., "Microfabricated Capillary Electrophoresis Amino Acid Chirality Analyzer for Extraterrestrial Exploration", Analytical Chemistry, Sep. 15, 1999, vol. 71, No. 18, pp. 4000-4006.

Ilic et al., "Mechanical Resonant Immunospecific Biological Detector", Applied Physics Letters, Jul. 17, 2000, vol. 77, No. 3, pp. 450-452.

Ju et al., "Energy Transfer Primers: A New Fluorescence Labeling Paradigm for DNA Sequencing and Analysis", Nature Medicine, Feb. 1996, vol. 2, No. 2, pp. 246-249.

Kelly, "Unidirectional Rotary Motion in a Molecular System", Nature, Sep. 9, 1999, vol. 401, pp. 150-152.

Kim et al., "Nanotube Nanotweezers", Science, Dec. 10, 1999, vol. 286, pp. 2148-2150.

Korgel et al., "Self-Assembly of Silver Nanocrystals into Two-Dimensional Nanowire Arrays", Advanced Materials, 1998, vol. 10, No. 9, pp. 661-665.

Koumura et al., "Light-Driven Monodirectional Molecular Rotor", Nature, Sep. 9, 1999, vol. 401, pp. 152-155.

Lee et al., "Low-Temperature Growth of Carbon Nanotubes by Thermal Chemical Vapor Deposition Using Pd, Cr, and Pt as Co-Catalyst", Chemical Physics Letters, Sep. 15, 2000, vol. 327, pp. 277-283.

Li et al., "Carbon Nanotube Films Prepared by Thermal Chemical Vapor Deposition at Low Temperature for Field Emission Applications", Applied Physics Letters, Sep. 10, 2001, vol. 79, No. 11, pp. 1670-1672.

Masuda et al., "Highly Ordered Nanochannel-Array Architecture in Anodic Alumina", Appl. Phys. Lett., Nov. 10, 1997, vol. 71, No. 19, pp. 2770-2772.

Merkulov et al., "Patterned Growth of Individual and Multiple Vertically Aligned Carbon Nanofibers", Applied Physics Letters, Jun. 12, 2000, vol. 76, No. 24, pp. 3555-3557.

Murakami et al., "Field Emission from Well-Aligned, Pattterned, Carbon Nanotube Emitters", Applied Physics Letters, Mar. 27, 2000, vol. 76, No. 13, pp. 1776-1778.

Nakamura, "InGaN-Based Violet Laser Diodes", Semicond Sci. Technol., 1999, vol. 14, pp. R27-R40.

Öttinger, "A Thermodynamically Admissible Reptation Model for Fast Flows of Entangled Polymers", J. Rheol, Nov./Dec. 1999, vol. 43, No. 6, pp. 1461-1493.

Poncharal et al., "Electrostatic Deflections and Electromechanical Resonances of Carbon Nanotubes", Science, Mar. 5, 1999, vol. 283, pp. 1513-1516.

Ren et al., "Synthesis of Large Arrays of Well-Aligned Carbon Nanotubes on Glass," Science, vol. 282, Nov. 6, 1998, pp. 1105-1107.

Ren et al., "Growth of a Single Freestanding Multiwall Carbon Nanotube on Each Nanonickel Dot", Applied Physics Letters, Aug. 23, 1999, vol. 75, No. 8, pp. 1086-1088.

Reulet et al., "Acoustoelectric Effects in Carbon Nanotubes", Physical Review Letters, Sep. 25, 2000, vol. 58, No. 13, pp. 2829-2832.

Roukes, "Nanoelectromechanical Systems", Technical Digest of the 2000 Solid-State Sensor and Actuator Workshop, Hilton Head Island, SC, Jun. 4-8, 2000, pp. 1-10.

Routkevitch et al., "Nonlithographic Nano-Wire Arrays: Fabrication, Physics, and Device Applications", IEEE Transactions on Electron Devices, Oct. 10, 1996, vol. 43, No. 10, pp. 1646-1658.

Schmalzing et al., "Toward Real-World Sequencing by Microdevice Electrophoresis", Genome Research, 1999, vol. 9, pp. 853-858.

Soper et al., "Nanoliter-Scale Sample Preparation Methods Directly Coupled to Polymethylmethacrylate-Based Microchips and Gel-Filled Capillaries for the Analysis of Oligonucleotides", Journal of Chromatography A, 1999, vol. 853, pp. 107-120.

Spatz et al., "Ordered Deposition of Inorganic Clusters From Micellar Block Copolymer Films," Langmuir, 2000, vol. 16, pp. 407-415.

Thurn-Albrecht et al., "Ultrahigh-Density Nanowire Arrays Grown in Self-Assembled Diblock Copolymer Templates," Science, Dec. 15, 2000, vol. 290, pp. 2126-2129.

Turner et al., "Monolithic Nanofluid Sieving Structures for DNA Manipulation", J. Vac. Sci. Technol. B, vol. 16, No. 6, Nov./Dec. 1998, pp. 3835-3840.

Van Der Gaag et al., "Microfabrication Below 10 nm", Appl. Phys. Lett, Jan. 29, 1990, vol. 56, No. 5, pp. 481-483.

Volkmuth et al., "DNA Electrodiffusion in a 2D Array of Posts", Physical Review Letters, Mar. 28, 1994, vol. 72, No. 13, pp. 2117-2120.

Volkmuth et al., "DNA Electrophoresis in Microlithographic Arrays", Nature, vol. 358, Aug. 13, 1992, pp. 600-602.

Westermeier, "Electrophoresis In Practice, A Guide to Method and Applications of DNA and Protein Separations, Chapter I—Electrophoresis", Second Edition, VCH, A Wiley Company, 1997, pp. 5-39, title page, copyright page.

Wildöer et al., "Electronic Structure of Atomically Resolved Carbon Nanotubes", Nature, Jan. 1, 1998, vol. 391, pp. 59-62.

Xu, "Capillary Electrophoresis", Analytical Chemistry, Jun. 15, 1999, vol. 71, No. 12, pp. 309R-313R.

Yang et al., "Generalized Syntheses of Large-Pore Mesoporous Metal Oxides With Semicrystalline Frameworks," Nature, Nov. 12, 1998, vol. 396, pp. 152-155.

Yoon et al., "Comparison of Chain Conformations for Polystyrene and Model Molecules in the Gas Phase, Solvents and Melts from MD Simulations", Abstracts of Papers, Part 2, 215th ACS National Meeting, American Chemical Society, Mar. 29-Apr. 2, 1998, 1 pg., cover page.

Yu et al., "Tensile Loading of Ropes of Single Wall Carbon Nanotubes and their Mechanical Properties", Physical Review Letters, Jun. 12, 2000, vol. 84, No. 24, pp. 5552-5555.

Zhang et al., "Elastic Response of Carbon Nanotube Bundles to Visible Light", Physical Review Letters, Apr. 26, 1999, vol. 82, No. 17, pp. 3472-3475.

Zhang et al., "Electric-Field-Directed Growth of Aligned Single-Walled Carbon Nanotubes", Applied Physics Letters, Nov. 5, 2001, vol. 79, No. 19, pp. 3155-3157.

Zhang et al., "Formation of Single-Wall Carbon Nanotubes by Laser Ablation of Fullerenes at Low Temperature", Applied Physics Letters, Nov. 15, 1999, vol. 75, No. 20, pp. 3087-3089.

Correa-Duarte et al., "Fabrication and Biocompatibility of Carbon Nanotube-Based 3D Networks as Scaffolds for Cell Seeding and Growth", Nano Letters, 2004, vol. 4, No. 11, pp. 2233-2236.

Chakrapani et al., "Capillarity-Driven Assembly of Two-Dimensional Cellular Carbon Nanotube Foams", ONAS, Mar. 23, 2004, vol. 101, No. 12, pp. 4009-4012.

Huang et al., Inherent-Opening Controlled Patter Formation in Carbon Nanotube Arrays, Nanotechnology, 18 (2007) 305301:1-6.

* cited by examiner

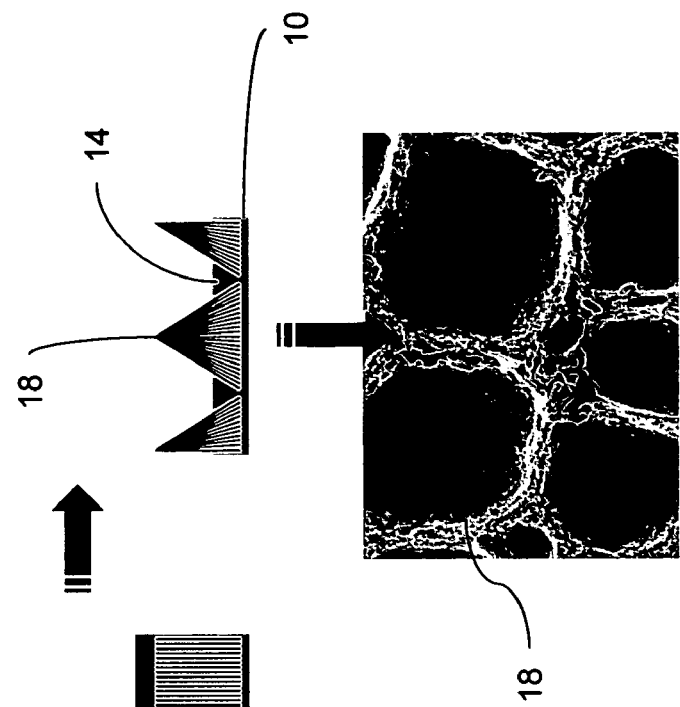
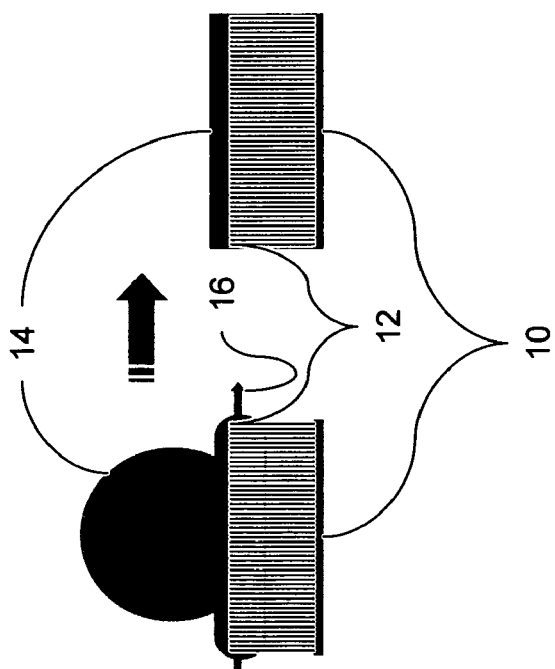
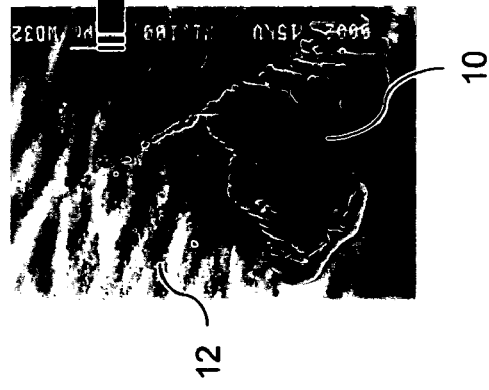

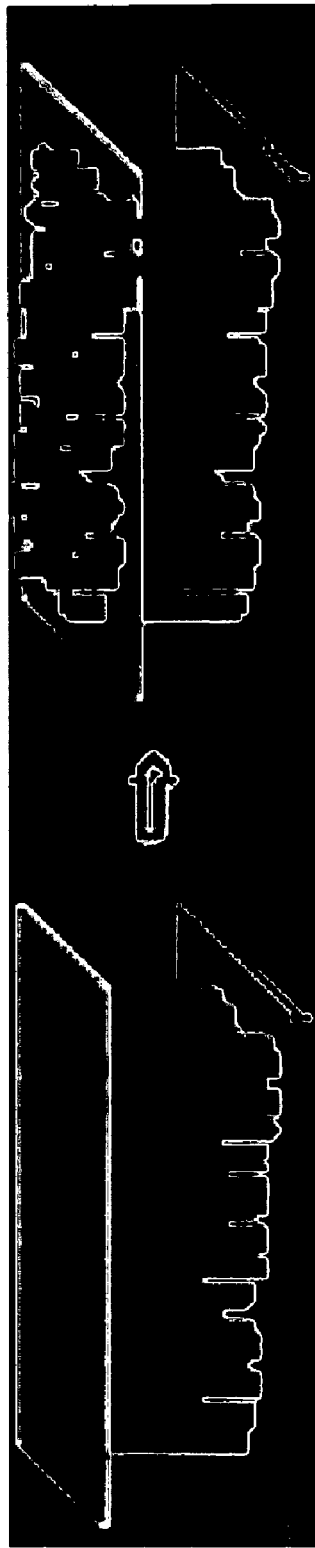
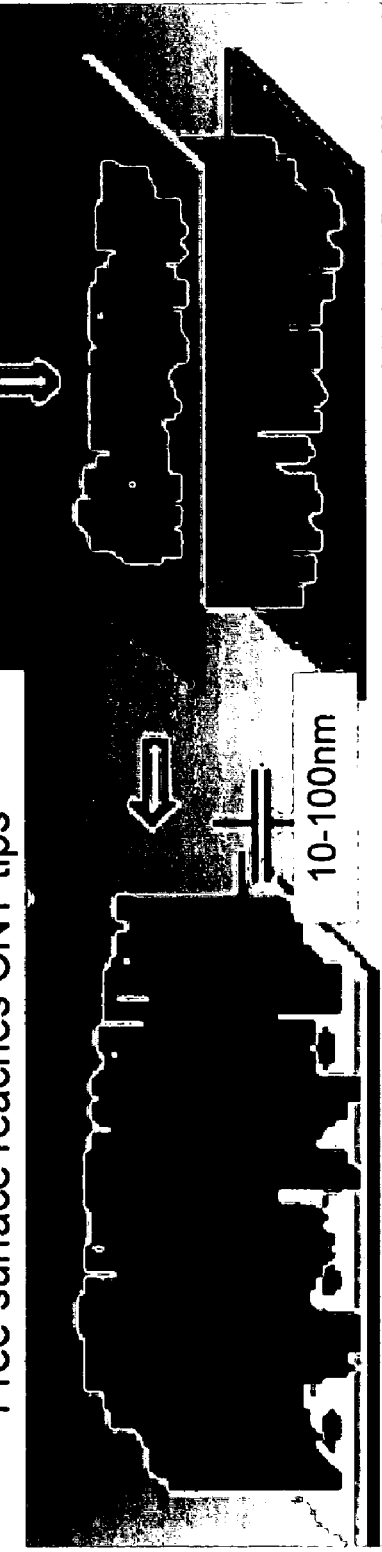
FIG. 5a
FIG. 5b
Free surface reaches CNT tips
CNT tips pulled together by lateral capillary force, stick by VdW
FIG. 5c
10-100nm
Dewetting instabilities cause holes and rupture, CNTs deform with the liquid
FIG. 5d

US 7,491,628 B2

METHOD FOR PATTERNING LARGE SCALE NANO-FIBROUS SURFACES USING CAPILLOGRAPHY

CROSS-REFERENCE TO RELATED APPLICATION(S)

This application claims priority to U.S. Provisional Application No. 60/568,563, filed May 5, 2004, the disclosure of which is fully incorporated herein by reference.

STATEMENT REGARDING FEDERALLY SPONSORED RESEARCH

The U.S. Government has certain rights in this invention pursuant to grant No. NAS 7-1407, awarded by the National Aeronautics and Space Administration, Office of Space Science.

FIELD OF THE INVENTION

The present invention is directed to the controlled patterning and arrangement of groups of nanoscale objects, and more particularly to the controlled arrangement of dense carpets of carbon nanotubes using fluid forces.

BACKGROUND OF THE INVENTION

Nanoscale structures are becoming increasingly important because they provide the basis for devices with dramatically reduced power and mass, while simultaneously having enhanced capabilities, and previous patent applications have disclosed the advantageous use of such nanostructures in a number of different real-time, molecule specific sensors.

However, assembling large numbers of nanoscale structure in predetermined ways is notoriously difficult. For example, conventional nanoscale structures are arranged by patterning a substrate using e-beam lithography, which, while effective, is time-consuming and expensive. In addition, e-beam lithography requires the use of a limited number of well-defined, rigid substrate materials.

To solve these problems a number of recent publications have suggested the use of "capillarity-driven" assembly of groups of nanotubes. In such a system the dispersion and evaporation of a fluid on a dense mat of nanotubes drives the rearrangement and patterning of the nanotubes on the substrate surface. However, the current methods still fundamentally rely on patterning the substrate to "control" the capillarity-driven effect, and the ultimate nanostructure. For example, Chakrapani, et al. describe the results of capillarity-driven forces on already patterned nanotube structures. (See, e.g., Chakrapani, et al.; PNAS, vol. 101(12), pg. 4009-12 (Mar. 3, 2004)) Likewise, Liu, et al. discuss the use of "laser-etched" carbon nanotube surfaces to drive capillarity-driven effects to form highly controlled carbon nanotube structures. (Liu, et al., Angew. Chem. Int. Ed., vol. 43, pg. 1146-49 (2004)) In both of these results the investigators indicated that, if left alone, the capillary-driven forces would produce consistently irregular or irreproducible nanotube structures. As such, these methods still require the use of time-consuming and expensive lithography techniques to ensure the controlled growth of specific two-dimensional carbon nanotube formations.

Accordingly, a need exists for an improved method for inexpensively and controllably forming patterned nanoscale structures.

SUMMARY OF THE INVENTION

The current invention is directed to a method of using fluidic forces to controllably arrange and pattern a plurality of anchored nanofeatures to form permanent nanoscale structures.

In one embodiment, the nature of the nanoscale structure produced by the method of the current invention depends on the properties of the fluid used. In one such embodiment, the method uses a fluidic solvent selected from the group of water, ethanol, and acetone.

In another embodiment, the nature of the nanoscale structure produced by the method of the current invention depends on the properties of the nanofeatures, including, the size, shape, and bonding strength to the substrate. In one such embodiment, the method uses a plurality of carbon nanotubes having a diameter of 10 to 50 nm anchored to a substrate.

In still another embodiment, the nature of the nanoscale structure produced by the method of the current invention depends on the drying conditions used to dissipate the fluid. In one such embodiment, a high humidity is maintained around the nanoscale features to ensure a gradual drying process. In another such embodiment, a high temperature or a directed air flow is used on the nanoscale features to speed the drying process.

In yet another embodiment, the nature of the nanoscale structure produced by the method of the current invention depends on the properties of the substrate, including, the orientation of the substrate in space.

In still yet another embodiment, the nanoscale structures formed in accordance with the current method are trenches or complete or partial circular or semi-circular structures.

In still yet another embodiment, the nanoscale structures formed in accordance with the current method have a size of as small as 5 microns.

In still yet another embodiment, the nanoscale structures of the current invention are used to form field emission displays, thermal radiators, hydrodynamic structures, or micro-templates for tissue growth.

BRIEF DESCRIPTION OF THE DRAWINGS

These and other features and advantages of the present invention will be better understood by reference to the following detailed description when considered in conjunction with the accompanying drawings wherein:

FIG. 1a to 1e is a schematic view of an embodiment of a capillographic micro-patterning technique in accordance with the current invention.

FIGS. 5a to 5d show a schematic view of a demonstration of the capillographic micro-patterning technique in accordance with the current invention.

DETAILED DESCRIPTION OF THE INVENTION

The current invention is directed to a method of assembling large numbers of nanoscale structures in pre-determined patterns using fluids or capillary lithography to control the patterning and arrangement of the individual nanoscale objects, a technique that will be referred to herein as "capillography."

Figure 2:
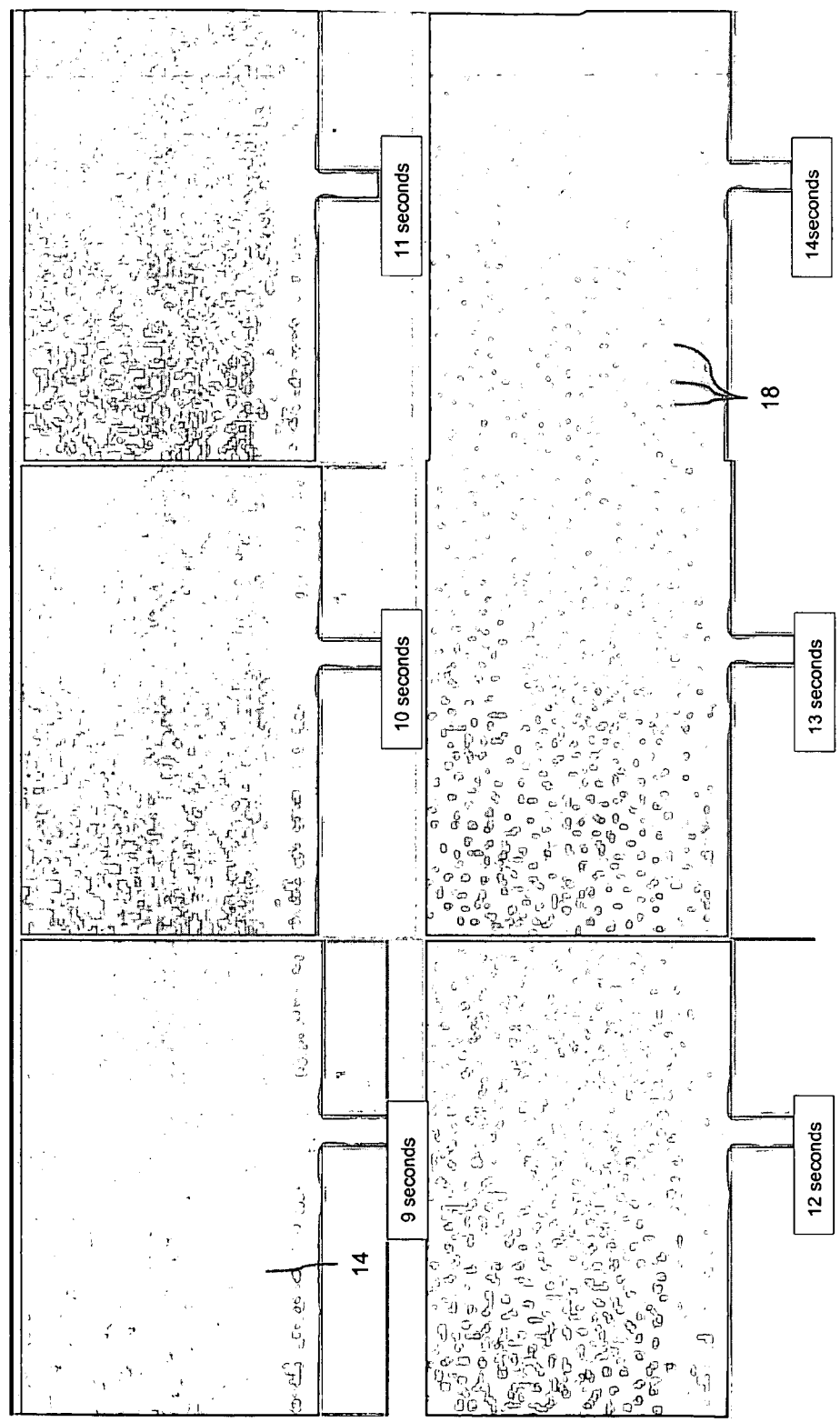
FIGS. 2a to 2f show top view micrograph pictures of the formation of patterned nanotube surfaces according to the invention.

In summary, the current method uses the controlled dispersion and evaporation of fluids to form controlled patterns of nanoscale objects or features anchored on a substrate, such as nanoscale fibers like carbon nanotubes. Shown in micrographs in FIGS. 1a and 1e. Specifically, FIG. 1a shows a substrate 10 having a dense array of nanofibers 12 thereon prior to reorientation, and FIG. 1e shows those same nanofibers after reorientation. FIGS. 1b to 1d, schematically show one embodiment of the controlled patterning method of the current invention. As shown in FIG. 1b, in a first step a substrate 10 having a plurality of anchored nanoscale features 12 is wetted by a droplet or film of liquid material 14. In a second step of the process, as shown by the arrows 16 in FIG. 1b, the liquid film disperses over and through the plurality of anchored nanoscale features 12 (see, e.g., FIG. 1c), as the liquid film 14 continues to dissipate, the anchored nanoscale features are pulled together into collective nanostructures 18 by the capillary forces exerted by the liquid film, as shown in FIG. 1d. A micrograph of the large collective structures 18 of the individual nanoscale features 12 formed on the surface of the substrate when the liquid film is fully dissipated from the surface of the substrate after is shown in FIG. 1e. Micrographs showing the progression of this formation process on an actual sample are also provided in FIGS. 2a to 2f. (Note the same reference numerals are used in the collective groups of FIGS. 1 and 2 to provide a direct comparison.)

Figure 3:
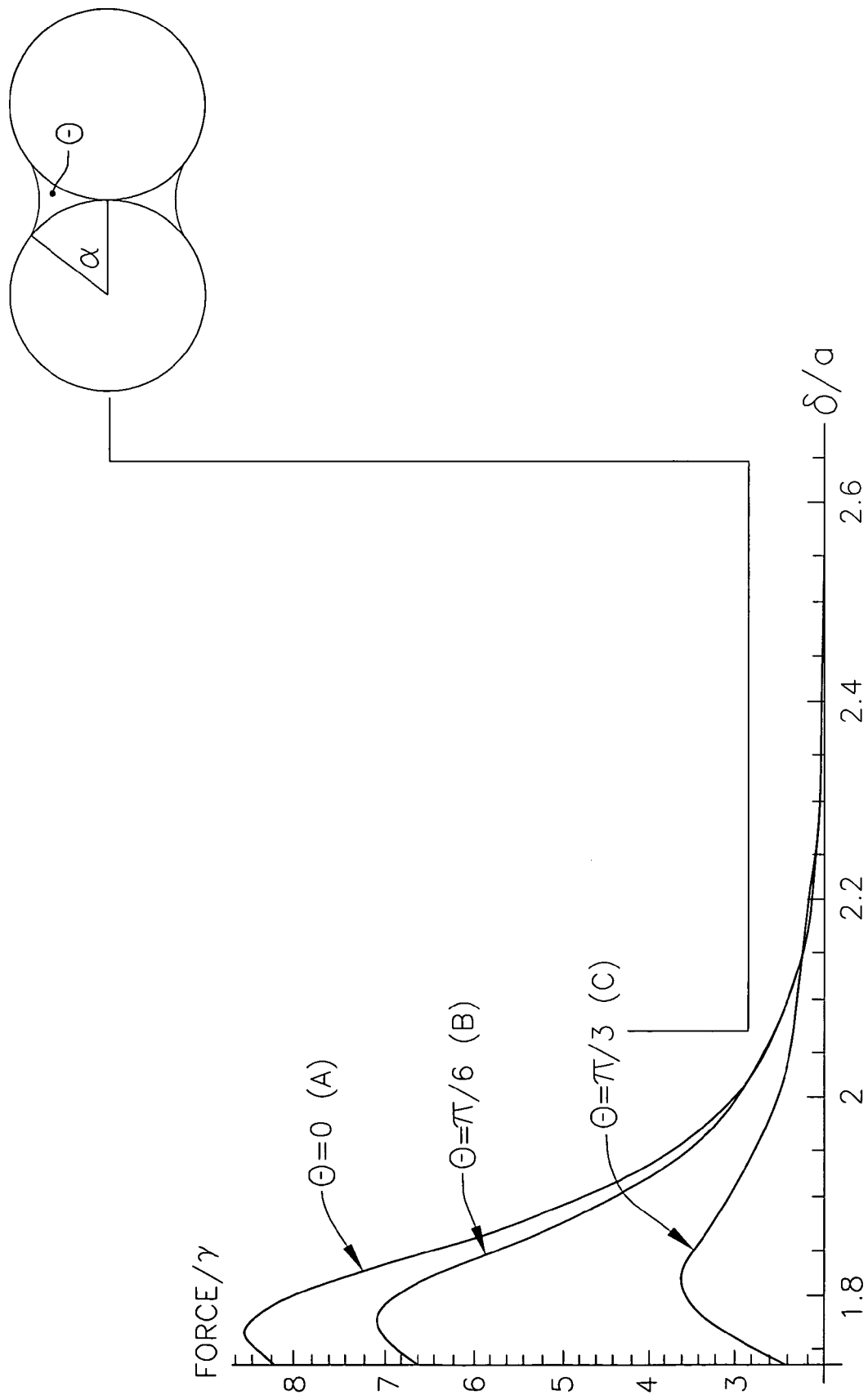
FIG. 3 shows a graphical depiction of data showing the lateral capillary forces on adjacent particles.
Figure 4B:
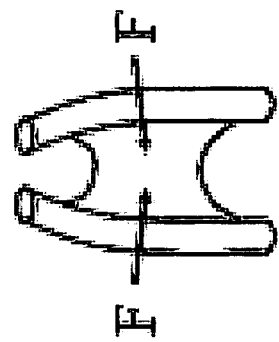
FIGS. 4a and 4b show micrograph and schematic images of the lateral attractive forces on adjacent glass tubes.
Figure 4A:
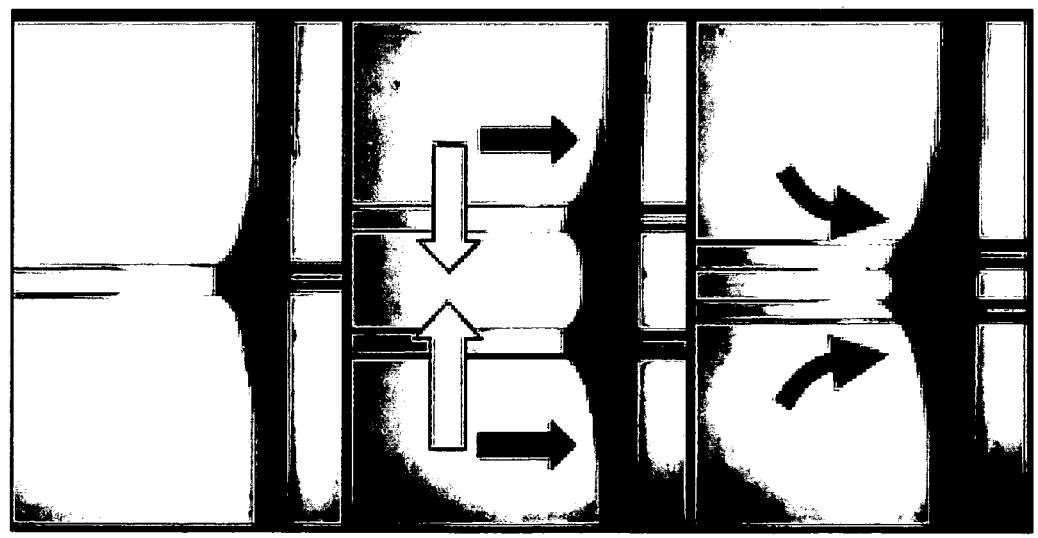

As discussed above, the current inventive method uses fluidic forces to controllably arrange and pattern individual nanofeatures into large collective nanostructures. The principle behind this process lies in the nature of the interaction between the nanofeatures and the liquid. For example, when objects pierce a fluid interface, those objects are subject to surface tension related forces, according to the equation:

$$F = \gamma\left[\frac{2a\sin\alpha}{c} + 2\sin(\alpha + \theta)\right] \quad (1)$$

where $\gamma$ is the force, and $\alpha$ and $\theta$ describe the contact area between the object and the liquid. A plot of the force on these particles based on the distance between the particles is plotted in FIG. 3, in the subset to FIG. 3 a schematic diagram of $\alpha$ and $\theta$ are provided. The plot of forces shown in FIG. 3 is taken from Urso et al., "A Two-dimensional Study of the Rupture of Funicular Liquid Bridges", (Chemical Engineering Science 57 (4): 677-692, February 2002), the disclosure of which is incorporate herein by reference. In short, for small particles that pierce an interface, but are supported by a solid surface, such as the anchored nanofeatures of the current invention, the interaction energies are many times larger than kT, the thermal energy. Further, it is well-known that for identical particles the interactions are always attractive. For example, for ~10 nm radii spherical particles immersed in water, with an edge-to-edge separation distance of 2 radii, the attraction energy is ~100 kT. An SEM image of two glass tubes undergoing this lateral attractive force is provided in FIG. 4a, with arrows drawn in to illustrate the direction of the lateral forces. The SEM pictures shown in FIG. 4a are taken from Velev et al., "Direct Measurement of Lateral Forces" (Langmuir, 9(12): 3702-3709, December 1993), the disclosure of which is incorporate herein by reference. A schematic of the operation of this lateral attractive force is provided in FIG. 4b.

Figure 6:
FIG. 6 shows a micrograph of an embodiment of a nanostructure in accordance with the current invention.
Figure 7C:
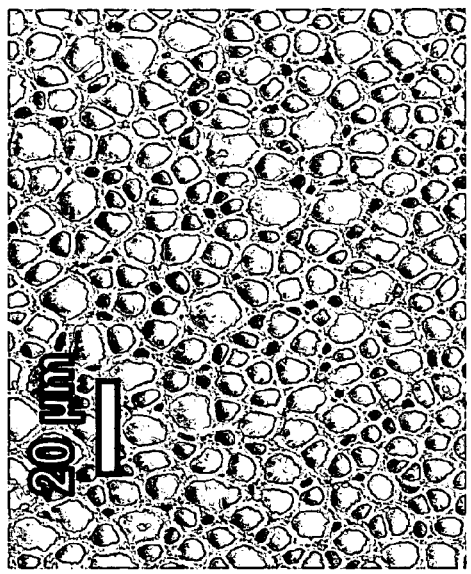
FIGS. 7a to 7d show top view micrograph pictures at different resolutions of a first embodiment of a patterned nanotube surface according to the invention.
Figure 7D:
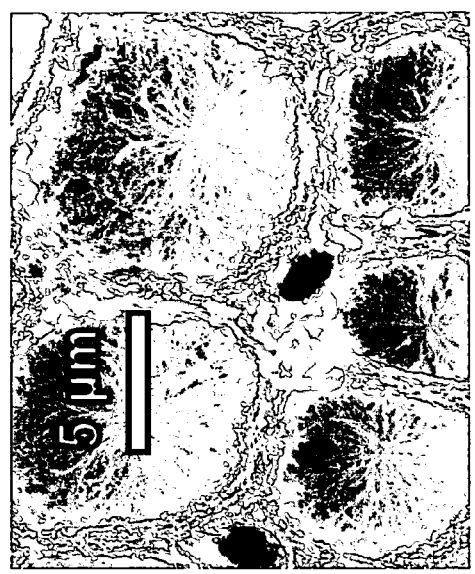
Figure 7A:
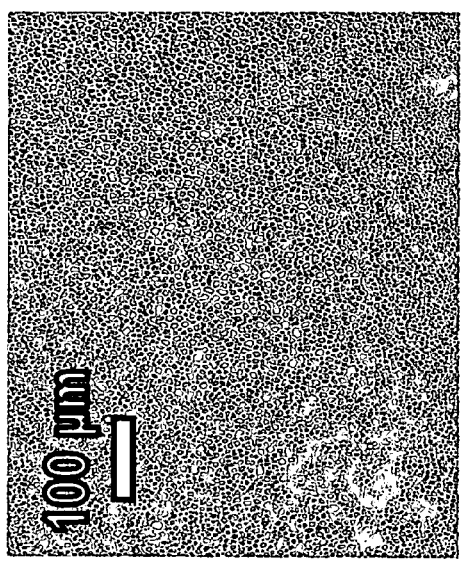
Figure 7B:
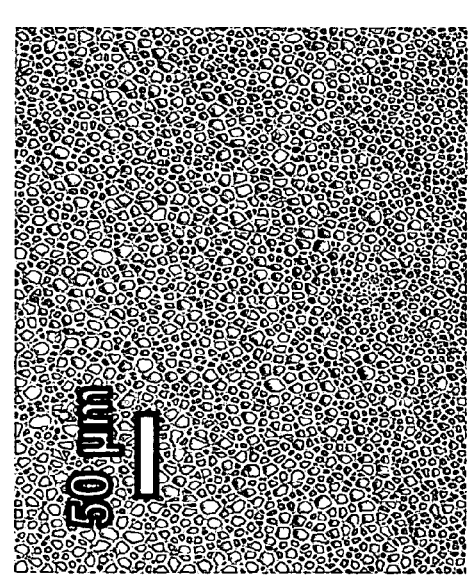

Accordingly, when a substrate having a plurality of nanofeatures arranged thereon is treated with a liquid material, a liquid-air interface is created, and the result is a large number of nanofeatures piercing the liquid-air interface (see, e.g., FIG. 5a). As a result, large lateral capillary forces act on the fibers. As the liquid retreats during dewetting or evaporation, these attractive forces in turn cause assembly of the individual nanofeatures into large-scale nanostructures (see, e.g., FIGS. 5b to 5d). Contrary to etch-out or lift-off processes associated with lithography, the current nano-patterning technique does not carve out or add material, but uses these fluidic forces to simply comb surface-pinned fibers (just like hair on a head). Since nanocarpet fibers are grown normal to a substrate and are lightly anchored at their base, capillographic patterns have a natural corrugation (of height given roughly by the nanotube length), unlike surface-flush patterns resulting from drying solutions of freely floating fibers (and spheres). The SEM micrograph of FIG. 6 provides an extreme close up of a nanostructure formed in accordance with the current technique and illustrates both the "combing" or reorientation of nanofibers, and the corrugation of the surface that results from the reorientation.

Although the current technique uses fluids to simply reorient nanofeatures without for the most part permanently removing them from the surface, it should also be understood that because of the strong van der Waals forces holding the nanofeatures together after reorientation, the nanostructures are sturdy, and, in particular, unaffected by additional wetting and drying processes. Accordingly, these nanostructures are fixed once the orientation method of the current invention has been completed.

Although not to be bound by the theory described above, during the reorientation process brought on by the wetting and drying of the nanofeatures, some of the nanofeatures are pulled in either a radial or linear direction. In addition, in some cases the fluidic forces can even dislodge some of the nanofeatures from the substrate leaving unoccupied voids.

The result of these collective linear or radial reorientations is the formation of trench-like or semicircular formations. By controlling the substrate, the properties of the nanofeatures, the properties of the liquid material, and the drying processes; the size, shape and orientation of the collective nanostructures that result from the capillographic arrangement of the individual nanofeatures can be controlled. A summary of the different control methods in accordance with the current invention, and the patterns formed as a result of those methods is provided in Table 1, below.

TABLE 1

Methods of Controlling Capillography Process

| Parameter | Methods | Results |
| --- | --- | --- |
| Drying time | Varying the humidity, temperature, or airflow across the surface. | Changes in regularity of patterns, size, and degree of completion & maturity |
| Wetting Liquid (volatility) | Changing the volatility of the liquid, e.g., to high volatility liquids such as acetone, methanol, other organic solvents. | Formation of trench structures perpendicular to the retreating front of the liquid. |
| Wetting Liquid (surface tension) | Changing the surface tension of the liquid, such as by using surfactant solutions, low MW "PDMS" (poly(dimethylsiloxane)) that will evaporate. | Lower surface tension yields→ easier soaking of nanocarpet and larger "nests." (See definition following table.) Higher surface tension yields smaller nests. |
| Wetting Liquid (no evaporation) | Using a non-volatile liquid (i.e., higher MW PDMS) that will still soak nanocarpet such that evaporation is prevented. | Ensure full completion of nests, and nests with a more polygonal pattern. Material still wetted for use in liquid environments. |
| Wetting Liquid (suspension of microparticles) | Using a liquid with a high volume fraction of particles in solution, such as polystyrene microspheres in water. | Formation of trenches in nanocarpet in a crack pattern. |
| Fix the nanocarpet "roots" | Flow in thin (less than height of nanocarpet) layer of curable PDMS or "RTV" (room temperature vulcanized polymer) and then cure/crosslink the liquid prior to nesting. | Formation of more well-defined (and smaller) nests, i.e. "ideal", with no (or reduced degree of) ripping from substrate. |
| Substrate | Use a flexible substrate, such as adhesive tape, stick to top of nanocarpet then peel-off and flip over prior to nesting. | Nests on curved/flexible substrates for application to non-flat surfaces. |

Figure 8:
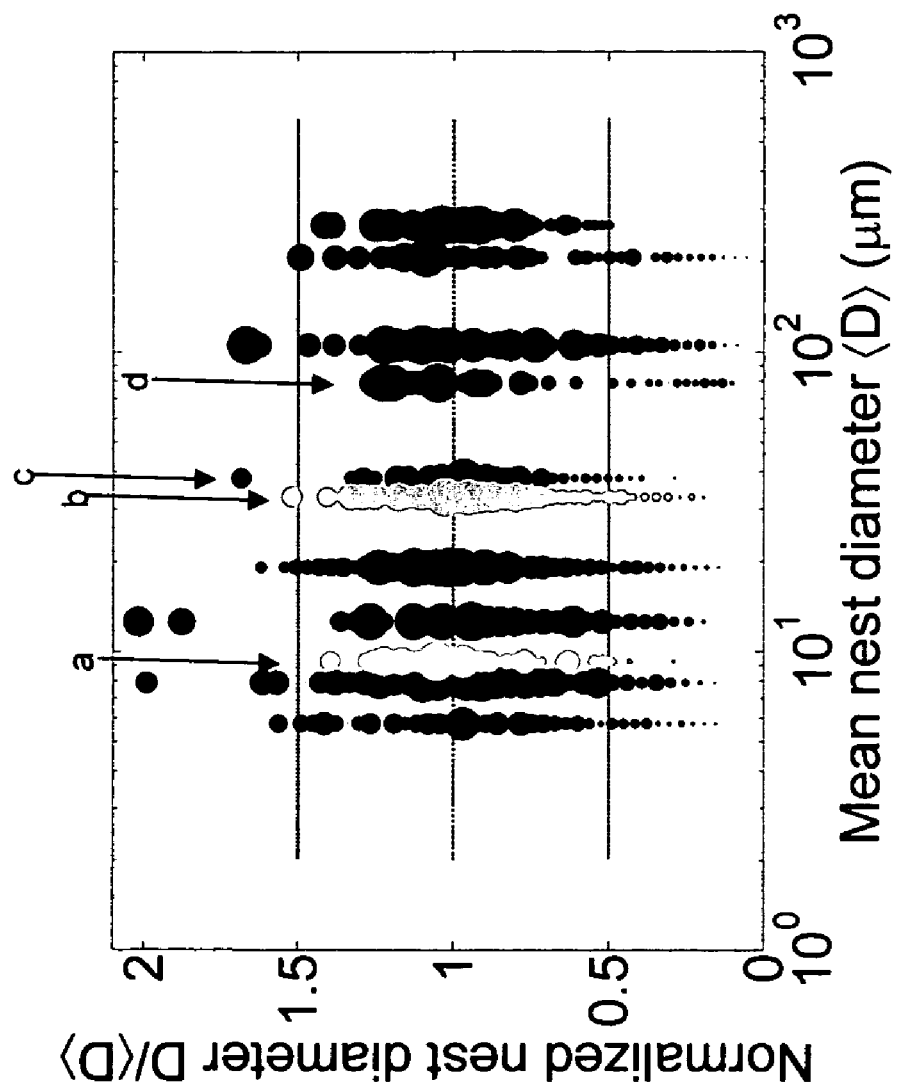
FIG. 8 is a graphical depiction of the controlled feature size of nanotube surfaces made in accordance with the method of the current invention in comparison with the size of features formed in accordance with a variety of prior art references.

For example, FIGS. 7a to 7d show different micrograph resolutions of a particular embodiment of the controlled nanostructures of the current invention wherein the nanostructure takes a semi-circular form, referred to herein as a "nest" nanostructure. As shown in FIGS. 7a to 7d, collectively, "nest" nanostructures having diameters of ~5 μm were formed by the controlled capillographic method of the current invention. However, as discussed above by modifying the wetting or drying conditions, the size and nature of the nanofeatures, the orientation and material of the substrate, the size of these nest features can be controlled. FIG. 8 reports the results of a series of experiments using a variety of different conditions for substrates covered in carbon nanotubes. As shown, by varying the conditions under which the capillography process is performed the size of the nanostructures can be controlled from less than 10 μm to over 100 μm. In addition to data from the current process, FIG. 8 also plots data from other groups to show where the features formed according to those methods fall along this plot. This prior art data is indicated by arrows and letters ("a" is from S. Li. et al., *J. Phys. Chem. B* 106 9274-9276 (2002); "b" is from M. A. Correa-Duarte et al., *Nano Letters* 4 (11) 2233-2236 (2004); "c" is from H. Liu et al., *Angew. Chem. Int. Ed.* 43 1146-1149 (2004); and "d" is from N. Chakrapani et al., *PNAS* 101 409-4012 (2004)). As shown, the prior art methods only provide a single nanostructure size, none of these prior art groups describe a process for controllably varying the size of the nanostructures. In addition, all of the prior art results fall within a much narrower size distribution range, between about 10 μm to about 90 μm.

Figure 9B:
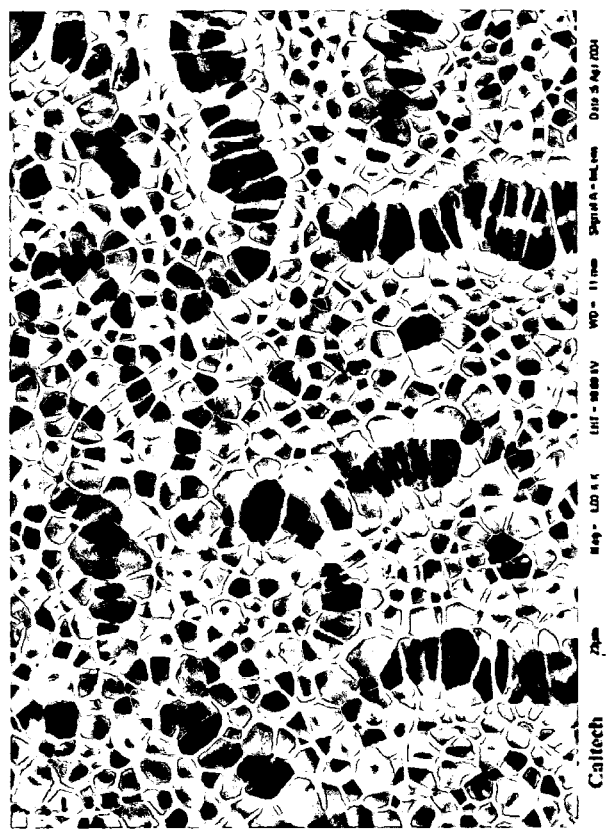
FIGS. 9a and 9b are top view micrograph pictures of a second embodiment of patterned nanotube surfaces according to the invention.
Figure 9A:
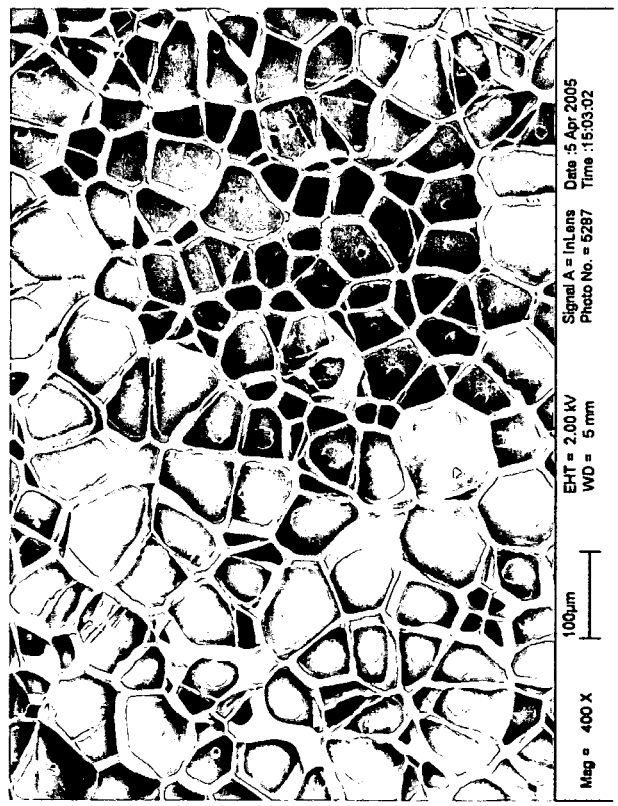
Figure 10B:
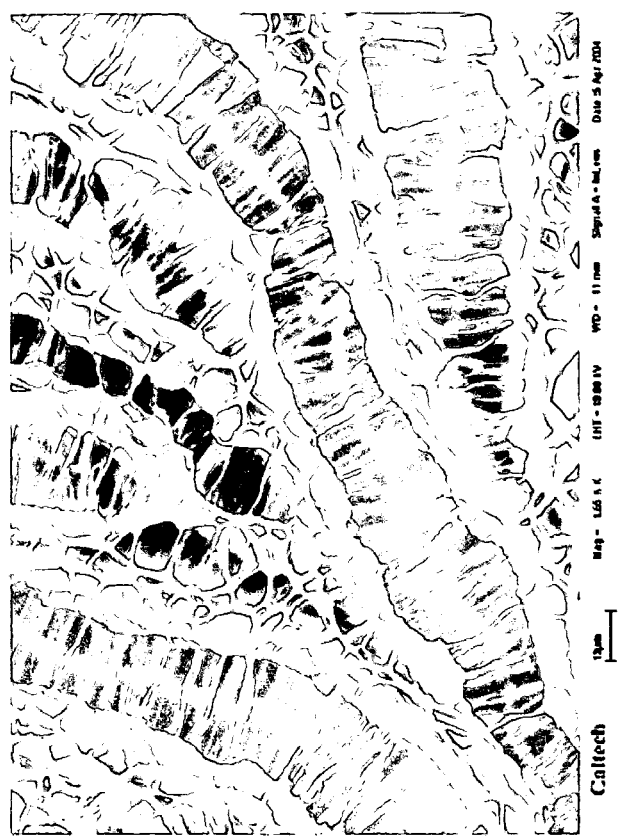
FIGS. 10a and 10b are top view micrograph pictures of a third embodiment of patterned nanotube surfaces according to the invention.
Figure 10A:
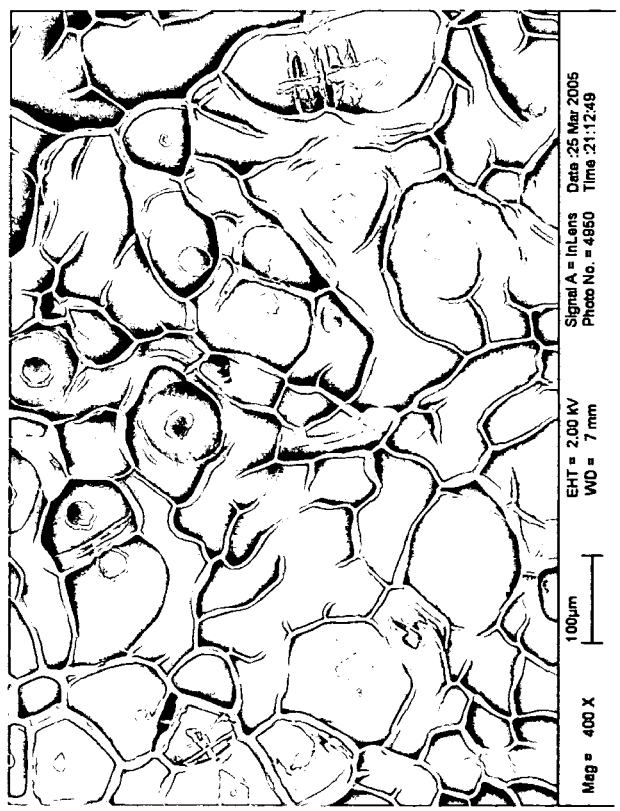
Figure 11:
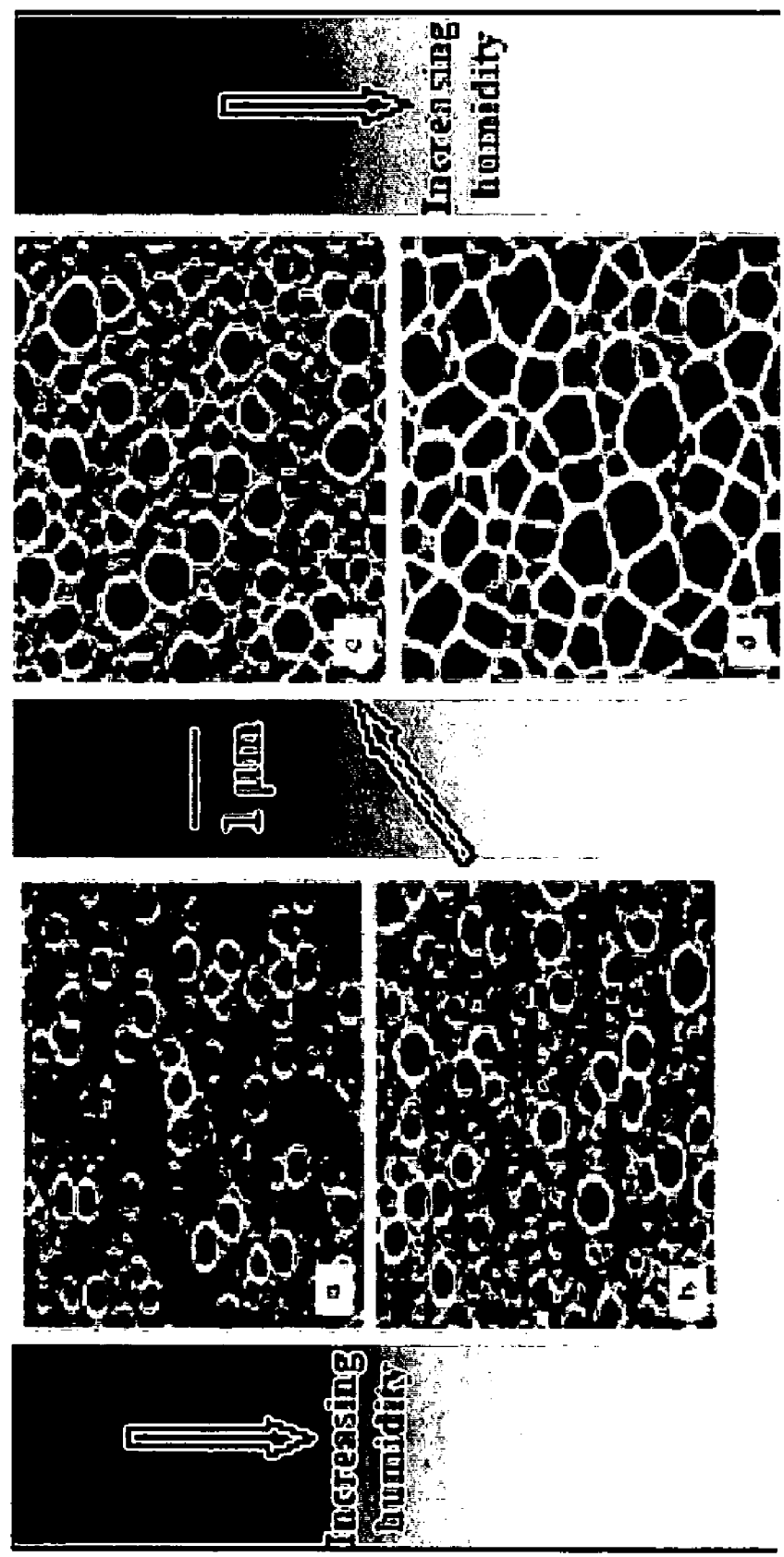
FIG. 11 is a series of top view micrograph pictures of a fourth embodiment of patterned nanotube surfaces according to the invention.

For example, it has been determined that keeping a high level of humidity allows for the gradual and complete rearrangement and patterning of the nanofeatures, resulting in the formation of progressively larger nest structures, while increasing the speed of the drying process prevents the complete formation of nests. In addition, because the "completion" of the "nests" depends on the drying conditions, the shape and nature of these semi-circular nanostructures can also be controlled by modifying the drying and wetting conditions. FIGS. 9 and 10 show semi-circular nanostructures formed under different drying conditions. In FIGS. 9a and 9b the drying was conducted slowly under high humidity conditions such that well-defined complete semi-circular formations are provided. In contrast, in FIGS. 10a and 10b the drying process is accelerated in 10a using an airflow, such as from a fan directed at the surface, and in 10b by using a solvent having a much higher volatility. As shown, in FIGS. 10a and 10b, the nanostructures formed have large trenches and nests with open sides, indicating incomplete formation of the nests and very fast drying of the fluid. Similarly, FIG. 11 shows a series of micrographs taken of nanostructure formation under increasingly humid conditions. As shown, as the humidity increases both the number and density of nanostructures increases.

Figure 12A:
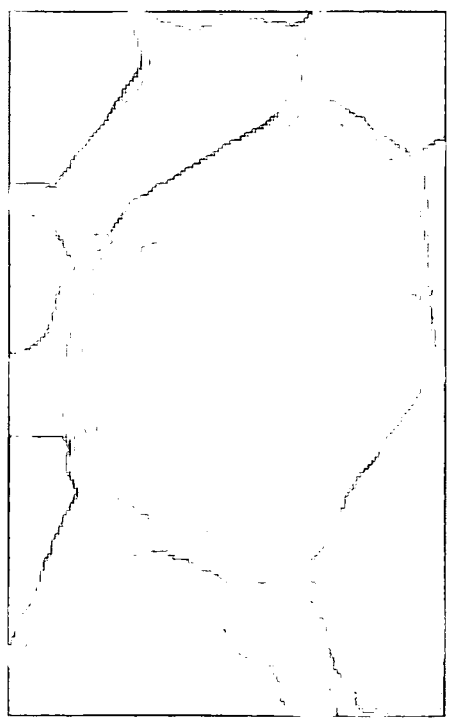
FIGS. 12a to 12c are a series of top view micrograph pictures of a fifth embodiment of patterned nanotube surfaces according to the invention.
Figure 12B:
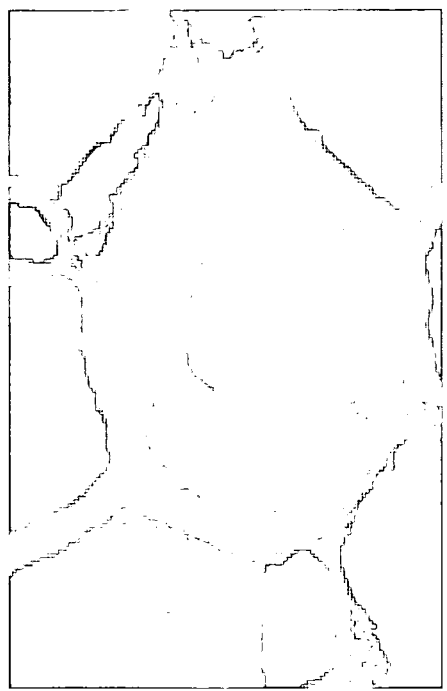
Figure 12C:
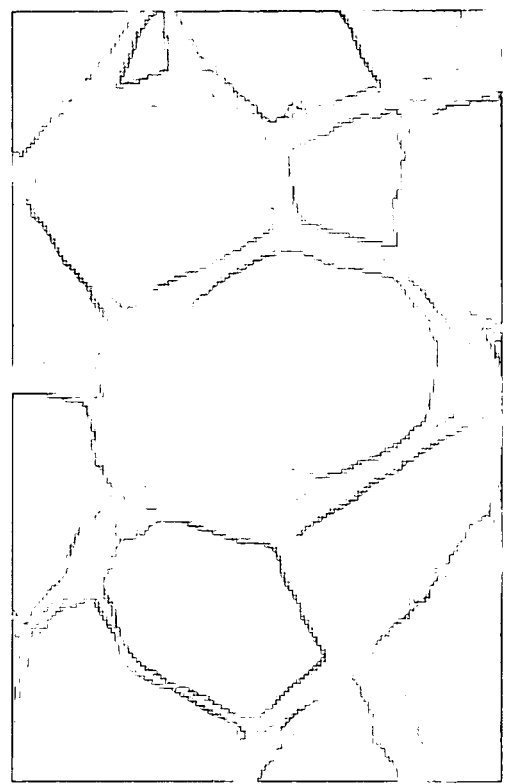

But, more than just altering the arrangement and density of nanostructures on the surface of the substrate, drying conditions also alter the structure of the nanostructures. For example, FIGS. 12a to 12c show a series of micrograph pictures of "nest" formations on a substrate under different drying conditions with FIG. 12a being the quickest drying sample and 12c being the slowest. As shown in FIG. 12c, a more measured drying process allows for the creation of a nest formation having very sharp distinct walls, while at faster conditions the nanotubes are not given sufficient time to form the sharp intersections between cells. Accordingly, by varying the drying conditions of the dewetting process the number, density, packing, and shape of the nanostructures formed in accordance with the present method can be controlled.

Moreover, because the size of the nests and trenches depends on the length and construction of the nanofeatures, another method of varying the pattern or size would be to supply progressively larger or smaller nanofeatures. For example, because the nanostructures are formed by the radial bending of a nanofeature downward toward the surface of the substrate, as shown in the micrograph of FIG. 6, there is a direct relation between the length of the nanofeatures and the area of the ultimate nanostructure. Accordingly, in one embodiment of the invention, the size of the nanostructures formed by the method of the current invention is controlled by the length and diameter of the nanofeatures disposed on the substrate. In such an embodiment, different regions of the substrate may be covered by nanofeatures of different proportions to form a series of variable dimensioned nanostructures. Moreover, although nanostructures only as small as 5 µm are discussed above, sub-micron sized nanostructures may be formed by using single-walled, sub-micron nanotubes.

Figure 13:
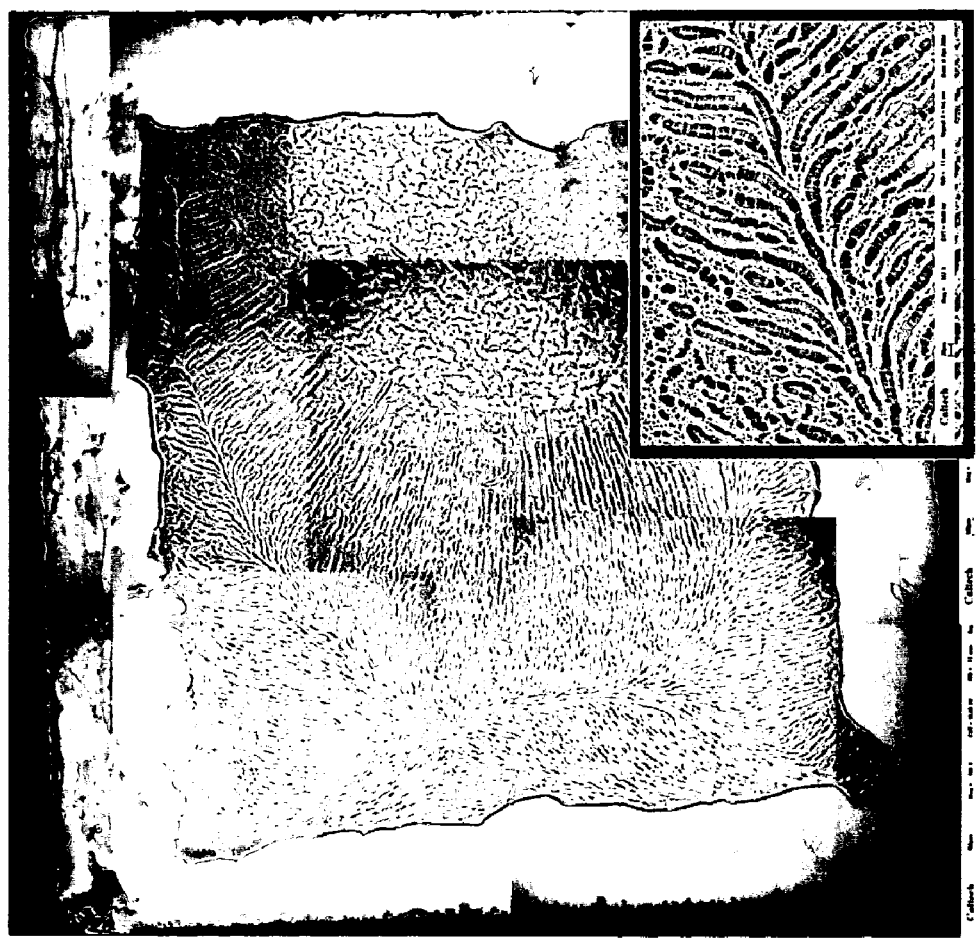
FIG. 13 is a top view micrograph picture of a sixth embodiment of a patterned nanotube surface according to the invention.
Figure 14B:
FIGS. 14a and 14b are top view micrograph pictures of a seventh embodiment of patterned nanotube surfaces according to the invention.
Figure 14A:
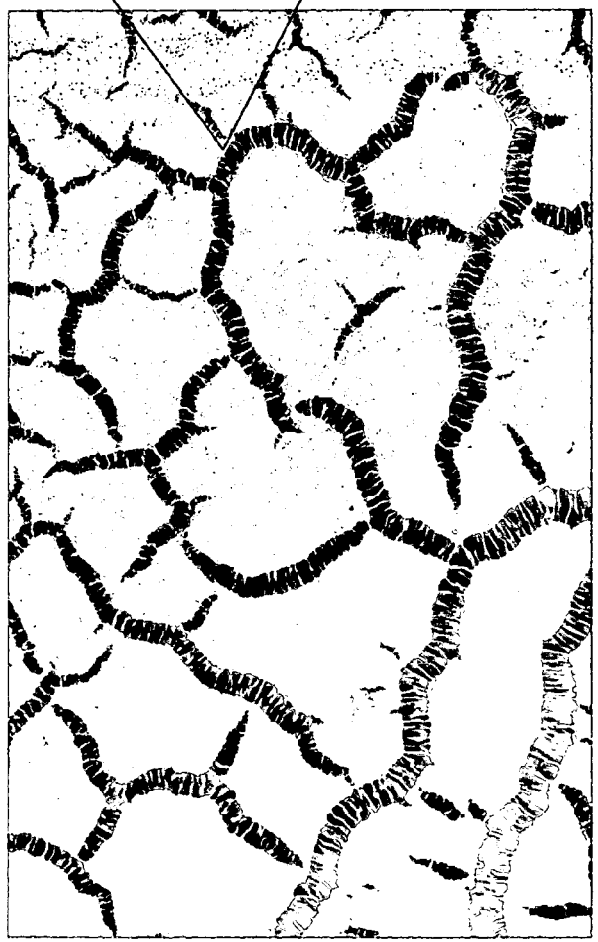

Finally, because the speed of drying and the nature of the wetting process inherently depends on the fluid used to expose the nanofeatures, altering the nature of the fluid can also be used to control the nanostructure formation. For example, using surfactant solutions that have a surface tension lower than water allows for a more facile wetting process over a hydrophobic surface such as is found with carbon nanotubes. As a result, the liquid is able to penetrate within the mat of nanotubes and can wick outward over a long distance. Moreover, the viscosity and the vapor pressure of the solvent will also determine how the liquid wicks through the nanofeatures, how strong the capillary forces are on the nanofeatures, and how quickly the liquid dries. Changing any one of these parameters can have significant impact on the nature of the formed nanostructures. For example, FIG. 13 shows an example where acetone is used as the wetting fluid. It has been found that using such low viscosity, high vapor pressure fluids, such as acetone spur the formation of these linear formations. In addition, as mentioned in Table 1, non-traditional wetting fluids may be used, such as non-evaporative fluids, that can remain at the surface for long periods of time such that no barrier exists to the complete formation of the nanostructures on the surface, or fluids consisting of suspensions of solids in liquid materials. Such exotic materials are capable of creating unique surface structure, such as the "cracked" surface pattern shown in FIG. 14a. In this example a suspension of polystyrene microspheres in water was applied to the surface. As shown in the higher resolution image in FIG. 14b, the microspheres collect together in lines forming crack-like trenches in the nanofeature surface. Accordingly, as discussed in Table 1, altering the fluid to which the nanofeatures are exposed may also be used to control the nature of the nanostructures of the current invention.

Figure 15A:
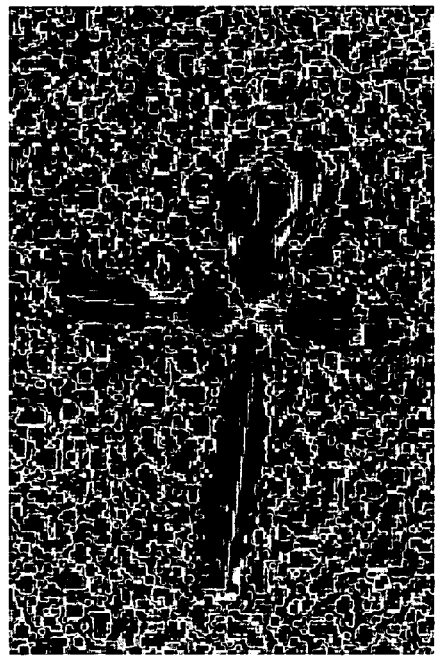
FIGS. 15a and 15b are top view micrograph pictures of an eighth embodiment of patterned nanotube surfaces according to the invention.
Figure 15B:
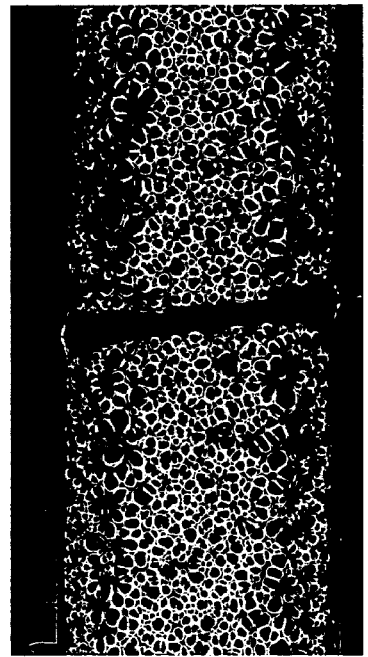

As discussed in Table 1, the substrate can also be used to control the nanostructures formed in accordance with the current invention. For example, the substrate may be made of any material which can withstand the temperatures required for growth of the nanofeatures and which can be optionally modified to provide a nucleation area for controllably positioning the nanostructure on a specified area of the substrate for integration with a suitable nanomechanical device. Examples of suitable substrates include metallized Si oxide wafers, alumina, or sapphire. Moreover, although only rigid substrates are considered in the examples of the current application, as discussed in Table 1, the capillographic technique of the current invention is applicable with surfaces of arbitrary curvature, such as flexible or curved surfaces. For example, in one embodiment, the nanofeatures are first grown on a rigid substrate, such as Si, and then an adhesive, such as a flexible tape is applied to the top of the nanotubes. The adhesive force of the tape is such that, once applied, the nanotubes can be removed with the tape. In this manner the nanotubes can be transferred from a rigid substrate to a flexible substrate, and then operated on as usual. In addition, pre-growth conditioning of the substrate can also lead to controlled patterning of the nanofeatures grown thereon. For example, FIGS. 15a and 15b shows an embodiment where macro-scale scratches were made on the surface of the substrate prior to growth of the nanofeatures. As shown, during reorientation, the nanotubes are bent away from this feature forming deep trenches surrounded by well-ordered "nest" formations.

Figure 16:
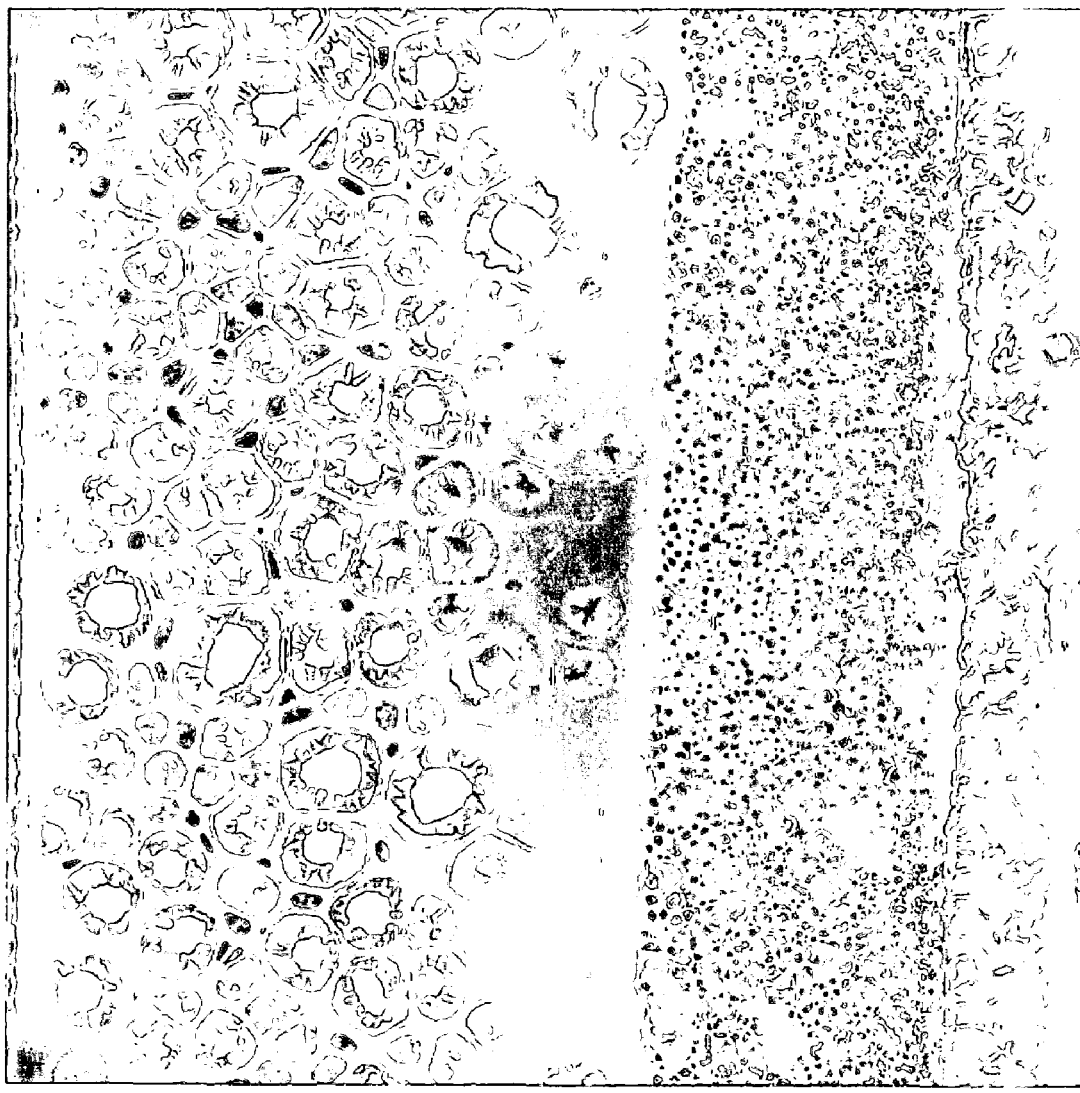
FIG. 16 is a top view micrograph picture of a ninth embodiment of a patterned nanotube surface according to the invention.

In addition, to modifying the actual material and condition of the substrate, the orientation of the substrate, and in turn the nanofeatures thereon can also be used to modify the nanostructures. Because the nanostructures formed by the capillography method of the current invention are created by fluidic forces pushing and pulling nanofeatures into new alignments, gravity plays a role on the form of the nanostructures. Accordingly, reorienting the substrate into a vertical or angled positioned can alter the orientation and structure of the nanostructures. For example, FIG. 16 shows the results of an experiment in which the substrate was held in a vertical orientation. As shown, the "nests" formed by the capillography process are deformed as a result of the gravitational forces acting perpendicular to the nanofeatures.

Where required, any suitable catalyzing metal can be used for the nucleation area on the surface of the substrate, such as, for example, nickel or cobalt. Alternatively, the catalyzing metal could be an alloy of two or more metals such as a Co/Ni or Ti/Ni alloy. The metal catalysts could also be produced by pyrolysis of inorganic or organic metal-containing compounds, such as, for example, Ferric Nitrate or Cobalt Chloride. Although not necessary for the current invention such catalyst regions could be controlled to a limit of sub-50 nm catalyst dots, thus it is possible to nucleate growth of a single nanotube at a catalyst location providing more than adequate control for ensuring proper placement of the nanostructure within a larger nanodetector. For nanoscale devices requiring energizing, integrated electrodes can also be produced by combining the catalyst regions with non-catalytic or catalytic electrodes. This ability to precisely locate and orient the growth of the nanostructure and make electrical contact to the nanofeatures provides the basis for fabrication of actuated structures.

Although nanotube nanoscale structures are shown in embodiments discussed above, it should be understood that any suitable nanoscale structure capable of being anchored to a surface may be used. However, in a preferred embodiment, as discussed above, a plurality of carbon nanotubes are utilized. Carbon nanotubes possess a combination of properties that make them well suited for use in the capillographic technique of the current invention. For example, nanotubes combine a nanometer scale diameter with a large aspect ratio, good electrical conductivity, and elastic bending. The small radius of curvature of the nanotubes induces large Van der Waals forces contributing to the "sticking" capabilities of the individual nanotubes. Carbon nanotubes are also hydrophobic, facilitating the interaction of the nanotubes when urged together in the liquid environment. Single-wall nanotubes also have a Young's modulus of approximately 1 TPa, which corresponds to a strength/weight ratio approaching 200 times that of steel. The combination of this high Young's modulus and the ability to withstand large strains (~5%) suggests that SWNTs should also have very high breaking strengths, allowing for the application of large reassembly forces.

Any suitable method may be used for growing the dense mats of nanofeatures on a substrate, such as, for example, a chemical vapor deposition (CVD) technique. The basic technique to construct the alignment structures, such as the dense nanofeature substrate shown in FIG. 1a, uses a suitable substrate, such as Si or SOI. To ensure proper growth, the region upon which the nanofeatures are to grow may be coated with a thin catalyst film such as Ni, Co, or other metal-based mixtures or compounds to nucleate nanofeature growth. Regardless of the substrate utilized to form the supports and electrodes, a chemical vapor deposition process (CVD) is utilized to grow the nanotubes from the catalyst patterns. In one embodiment, a high pressure CVD process uses methane, ethylene, or carbon monoxide in pure form or in a mixture with hydrogen (or ammonia) and argon (or nitrogen) to produce nanotubes on a substrate heated to approximately 500-1000° C.

Again, although one method for the self-assembly of carbon nanotubes is described above, it should be understood that in order to incorporate the carbon nanotube oscillators on CMOS electronics, such as might be necessary when integrating the nanostructure with an analyzer it is necessary to provide carbon nanotube growth at temperatures compatible with processed CMOS circuits, i.e., below about 500° C. Although any suitable method of low temperature growth may be utilized, some exemplary methods include: 1) Murikami et al. (*Appl. Phys. Lett.* 76(13), 1776 (2000)) method for growing carbon nanotube arrays for field emission at <600° C. using bias-enhanced microwave plasma CVD on patterned, nickel-based catalyst at 1-3 Torr; 2) Li et al. (*Appl. Phys. Lett.*, 79(11), 1670 (2001)) method of unaligned nanotube growth on glass at 570° C. using CVD at 100 Torr; 3) low temperature processes for growing carbon nanotubes on silicon (Choi et al., *J. Vac. Sci. Technol. A*, 18(4), 1864 (2000)): using 70 nm nickel films as a catalyst deposited on silicon substrates coated with TiN as an adhesion enhancement layer) and silicon dioxide (Lee et al., *Chem. Phys. Lett.* 327, 277 (2000)) between 500-550° C.; 4) Zhang and Iijima (*Appl. Phys. Lett.*, 75(20), 3087 (1999)) method for growing single-walled carbon nanotubes at 400° C. using laser ablation technique with powdered catalyst containing Ni—Co; and 5) Chen et al. (*J. Cryst. Growth*, 193, 342 (1998)) method of growing graphitic nanofibers on nickel substrates at 350-400° C. All of which are incorporated herein by reference.

While the self-assembled nanostructures contemplated in the embodiments discussed so far have been constructed of dense mats of carbon nanotubes made from pyrolizing an ethylene feedstock over a substrate, the nanofeatures comprising the nanostructure can be of any shape and made by any process and from any material suitable for making self-assembled structures that are anchored to the substrate, such as, for example, spheres or pyramids made of other atomic materials or even biomolecules, such as, for example, proteins. In another embodiment, the nanofeatures may be further functionalized for a variety of applications, such as, for example, being made hydrophilic or hydrophobic, being charged either negatively or positively, or being derivatized with specific chemical groups, etc. In addition, although only an untreated carbon nanotube nanostructure have been shown thus far, in situ sidewall treatments could alter the electrical properties of the nanotubes, such as by increasing the charge differential induced by a given applied voltage.

Finally, although the above discussion has focused on the construction and structure of the basic nanostructure, it should be understood that a device such as a detector made with the nanostructure according to the invention may also include a body, a self-contained power supply, and any additional machinery or circuitry necessary for the device's operation. For example, the body of the nanomechanical device itself can be made of any material suitable for micromachining utilizing standard lithographic or MEMS techniques to enclose the nanostructure, such as, for example, aluminum oxide or silicon. In a preferred embodiment, the body further comprises a cap layer, which can be of any design, such that the cap layer protects the controlled nanostructure from unwanted contact with the external environment. Such a cap layer could be made of any suitable material, such as, for example, aluminum oxide or silicon. Such a cap layer could be formed by any conventional MEMS process, such as growth or deposition over a sacrificial layer (not shown) deposited to encapsulate the self-assembled nanostructure wherein the sacrificial layer can subsequently be removed to expose the nanostructure itself. Alternatively, these support structures could be formed in a single deposition step with the self-assembled nanostructure. In a more preferred embodiment, one of the substrate, the cap layer, or walls of the nanomechanical device is transparent such that an optical source can be used to interrogate or activate the nanostructure.

In another alternative embodiment, a device having a controlled nanostructure in accordance with the current invention may comprise an array of multiple such nanostructures such that multiple or parallel processing can be carried out at one time. In this embodiment, the nanostructures can be integrated into a single circuit or detector. It should be understood that while arrays of nanostructures are discussed above, any suitable alternative geometry of nanostructures may be utilized. Such an embodiment could be used to develop a mobile nanostructure detector device on a chip for mobile detection and analysis of samples. In such an embodiment a portable power source (not shown) would also be integrated into the device.

Further, although the above discussion has been directed to the actual controlled nanostructures and methods of forming those controlled nanostructures according to the present invention, it should be understood that the invention is also directed to suitable nanomechanical devices comprising the nanostructures shown schematically in the above figures.

The scope of the invention will also be understood with reference to the following, non-limiting examples, which are provided to show how the operation of some of parameters discussed herein can be used to alter the nanostructures formed in accordance with the method of the current invention.

EXAMPLE 1

Nanotubes of 35 microns in length, a from about 20-30 nm diameter were grown on a quartz (amorphous SiO2, a glass slide) substrate metallized with 2 nm of Fe, then exposed to 0.5 CMC (Critical Micellar Concentration, which is about 8.2 mM for SDS) SDS for 10 minutes with a fan blowing across the surface and sitting under a microscope objective (for imaging). The resulting pattern is comprised of nests (semi-circular) of roughly 100 microns in mean diameter as well as immature patterns of disjointed ridges, effectively forming long canyons and trenches that do not reach the substrate surface. An SEM of the nanostructures formed according to this method is provided in FIG. 10a.

EXAMPLE 2

The method described in Example 1 was used, except that it was exposed for 25 minutes and had no fan blowing across the surface of the substrate. The method resulted in regular highly polygonal nests of mean diameter around 60-70 microns. An SEM of the nanostructures formed according to this method is provided in FIG. 9a.

EXAMPLE 3

Nanotubes of 4 microns in length, and about 35-50 nm diameter were grown on SiO2 metallized with 2 nm of Ni and 2 nm of Ti, then exposed to a pure water and bacterial spore solution with low volume fraction overnight under well-ventilated conditions. The pattern that formed was a highly regular distribution of nearly circular nests with a mean diameter of 4 microns, with comparatively wide barrier ridges between them (e.g., the ratio of width to diameter is large). SEMs of the nanostructures formed according to this method are provided in FIGS. 7a to 7d.

Although specific embodiments and exemplary embodiments are disclosed herein, it is expected that persons skilled in the art can and will design alternative controlled nanostructures and nanostructure combinations and methods to produce the nanostructures that are within the scope of the following claims either literally or under the Doctrine of Equivalents.

What is claimed is:

1. A method of controllably patterning a plurality of nanofeatures comprising:
   providing a plurality of nanofeatures anchored on at least one end to a substrate;
   disposing a quantity of a fluid onto at least a portion of the plurality of nanofeatures;
   flowing the fluid onto the plurality of nanofeatures such that the fluid penetrates between the plurality of nanofeatures; and
   controllably dissipating the fluid from the plurality of nanofeatures such that the nanofeatures are reoriented by the capillary forces of the dissipating fluid to form a plurality of repeating nanostructures from the reoriented nanofeatures,
   wherein the size and optionally at least one of the density and shape of the nanostructures are determined by controlling the rate at which the fluid dissipates from the substrate and by selecting the surface tension of the dissipating fluid.

2. The method of claim 1, wherein the step of providing the nanofeatures includes growing said nanofeatures using a chemical vapor deposition technique.

3. The method of claim 1, wherein the nanofeatures are nanotubes.

4. The method of claim 3, wherein the nanotubes are made of carbon atoms.

5. The method of claim 1, wherein fluid is a high volatile liquid such that the nanofeatures are reoriented to form trench structures on the surface of the substrate during dissipation of the fluid.

6. The method of claim 5, wherein the fluid is an organic solvent.

7. The method of claim 6, wherein the fluid is one of either methanol or acetone.

8. The method of claim 1, wherein the fluid is a curable polymer material, and wherein the method further includes the step of crosslinking the polymer prior to dissipation of the fluid such that the removal of nanofeatures from the substrate during dissipation is substantially eliminated.

9. The method of claim 8, wherein the polymer is one of either a PDMS or an RTV.

10. The method of claim 8, wherein the polymer is disposed on the substrate in a layer having a height no greater than the height of the nanofeatures.

11. The method of claim 1, wherein the substrate is substantially curved.

12. The method of claim 1, wherein the substrate is substantially flexible.

13. The method of claim 12, wherein prior to the step of disposing the fluid to the nanofeatures the method further comprises the steps of:

applying a flexible adhesive material to the top surface of the nanofeatures;
removing the adhesive material such that the nanofeatures are removed from the substrate but remain attached to the adhesive material such that the adhesive material becomes the substrate for the remaining steps of the process.

14. The method of claim 1, wherein the nanostructures formed are nest structures.

15. The method of claim 1, wherein decreasing the rate of dissipation at the surface of the nanofeatures increases the density of nanostructures formed.

16. The method of claim 1, wherein decreasing the rate of dissipation at the surface of the nanofeatures increases the average size of the nanostructures formed.

17. The method of claim 1, wherein decreasing the rate of dissipation at the surface of the nanofeatures increases the number of fully formed nanostructures.

18. The method of claim 1, wherein the step of controlling the rate of dissipation of the fluid comprises controlling the average humidity at the surface of the nanofeatures.

19. The method of claim 1, wherein the step of controlling the rate of dissipation of the fluid comprises controlling the temperature at the surface of the nanofeatures.

20. The method of claim 1, wherein the step of controlling the rate of dissipation of the fluid comprises controlling the flow of air over the surface of the nanofeatures.

21. The method of claim 1, wherein the average size of the nanostructures can be adjusted between about 1 µm and 1000 µm.

22. The method of claim 1, wherein decreasing surface tension of the fluid increases the size of the nanostructures formed.

23. The method of claim 22, wherein the average size of the nanostructures can be adjusted between about 1 µm and 1000 µm.

24. The method of claim 1, wherein the fluid is a low molecular weight PDMS.

25. The method of claim 1, wherein the fluid is chosen such that no evaporation of the fluid occurs during dissipation.

26. The method of claim 25, wherein the fluid is a high molecular weight PDMS.

27. The method of claim 1, wherein fluid comprises a suspension of microparticles.

28. The method of claim 27, wherein the suspension comprises a mixture of polystyrene microspheres in water.

29. The method of claim 1, wherein the nanofeatures have a height of less than a micron such that sub-micron nanostructures are formed during dissipation.

30. The method of claim 1, wherein the substrate is oriented in such a manner that the gravitational pull on the individual nanofeatures is in a direction other than normal to the top surface of the substrate.

31. A material having controllably patterned nanostructures made in accordance with the method described in claim 1 disposed thereon.

32. The material of claim 31, wherein the material is designed for use as an emitter material for field emission displays, a superhydrophobic hull material for full-scale hydrodynamic vehicles, a thermal radiator material for computer chipsets, and a micro-template material for biological tissue growth.

* * * * *